US007124954B2

(12) United States Patent
Schwartz

(10) Patent No.: US 7,124,954 B2
(45) Date of Patent: Oct. 24, 2006

(54) HINGE AND BINDING APPARATUS FOR DISPLAYING PROCEDURAL INFORMATION CARDS IN THE WORKPLACE

(75) Inventor: Russell J. Schwartz, Sausalito, CA (US)

(73) Assignee: The Thompson Corporation, Stamford, CT (US)

( * ) Notice: Subject to any disclaimer, the term of this patent is extended or adjusted under 35 U.S.C. 154(b) by 0 days.

(21) Appl. No.: 11/042,483

(22) Filed: Jan. 24, 2005

(65) Prior Publication Data

US 2005/0160642 A1 Jul. 28, 2005

Related U.S. Application Data

(60) Provisional application No. 60/579,503, filed on Jun. 10, 2004, provisional application No. 60/538,546, filed on Jan. 22, 2004.

(51) Int. Cl.
*G06K 7/00* (2006.01)
(52) U.S. Cl. ...................................... 235/486
(58) Field of Classification Search ............ 235/145 R, 235/380, 435, 486; 40/404, 405
See application file for complete search history.

(56) References Cited

U.S. PATENT DOCUMENTS

| 5,158,386 A * | 10/1992 | Mann, Jr. ..................... 402/41 |
| 5,557,096 A * | 9/1996 | Watanabe et al. ........... 235/492 |
| 6,533,236 B1 * | 3/2003 | MacLellan et al. ...... 248/442.2 |
| 6,672,621 B1 * | 1/2004 | Moss .......................... 281/36 |
| 2004/0086840 A1 * | 5/2004 | Redford et al. ............. 235/435 |

* cited by examiner

*Primary Examiner*—Thien M. Le
(74) *Attorney, Agent, or Firm*—Craig M. Stainbrook; Stainbrook & Stainbrook, LLP

(57) ABSTRACT

An apparatus for displaying procedural information cards in the workplace includes a central shaft having a ring portion at each end adapted to capture cards having slots. The central shaft may be releasably captured in a channel of a universal mount or a swing arm portion. Removal of the shaft portion from the channel permits the shaft to be split open, thereby opening the rings. Alternatively, the shaft portion may be used alone (without a mount or swing arm) to hold a quantity of cards. The swing arm may be hinged upon a base portion and attached to the peripheral surface surrounding a computer video monitor. When affixed to a monitor, the semicircular rings facilitate easy installation and flipping of instructional cards.

10 Claims, 4 Drawing Sheets

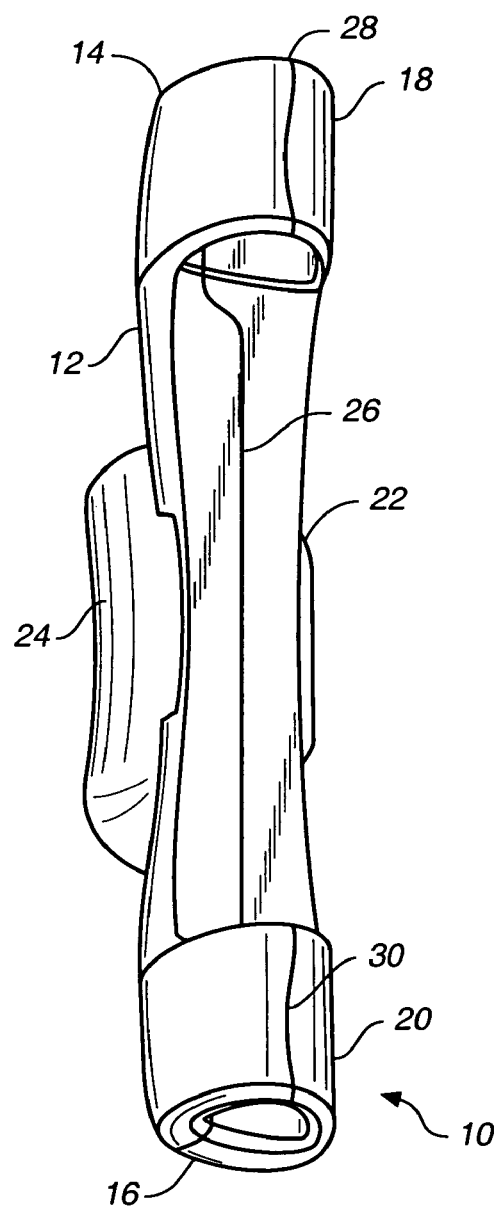 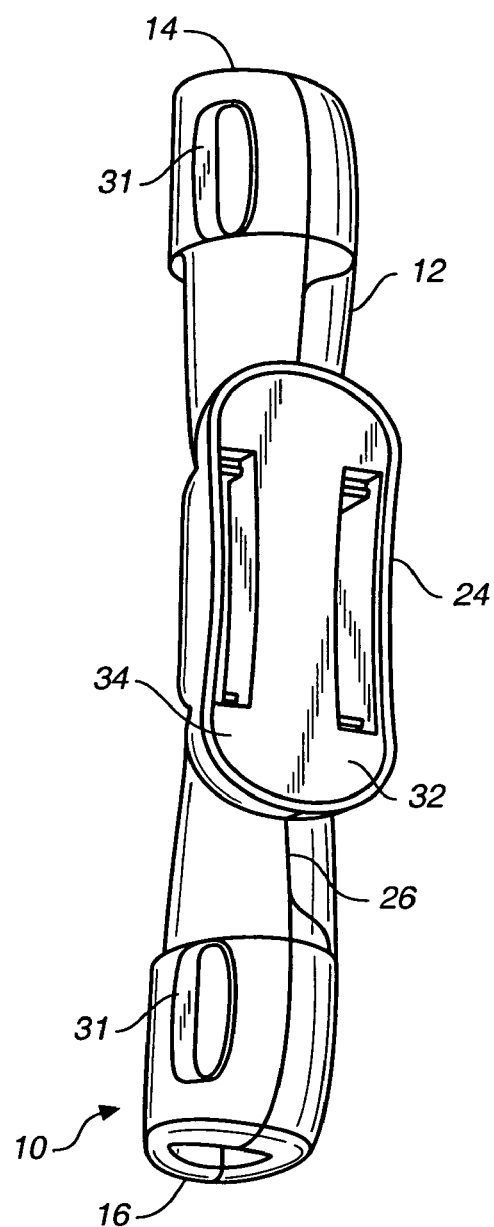
FIG._1A    FIG._1B

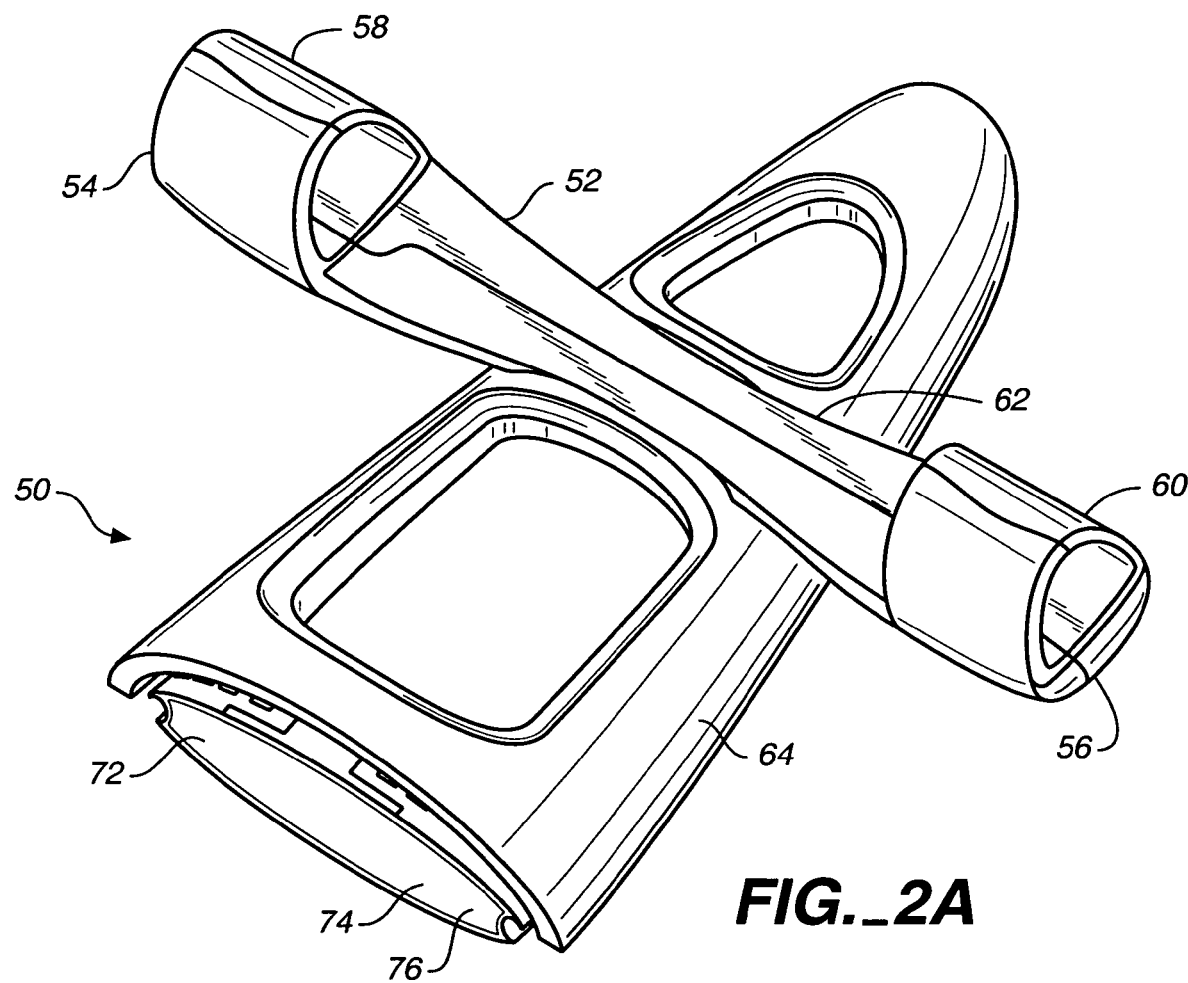
FIG._2A

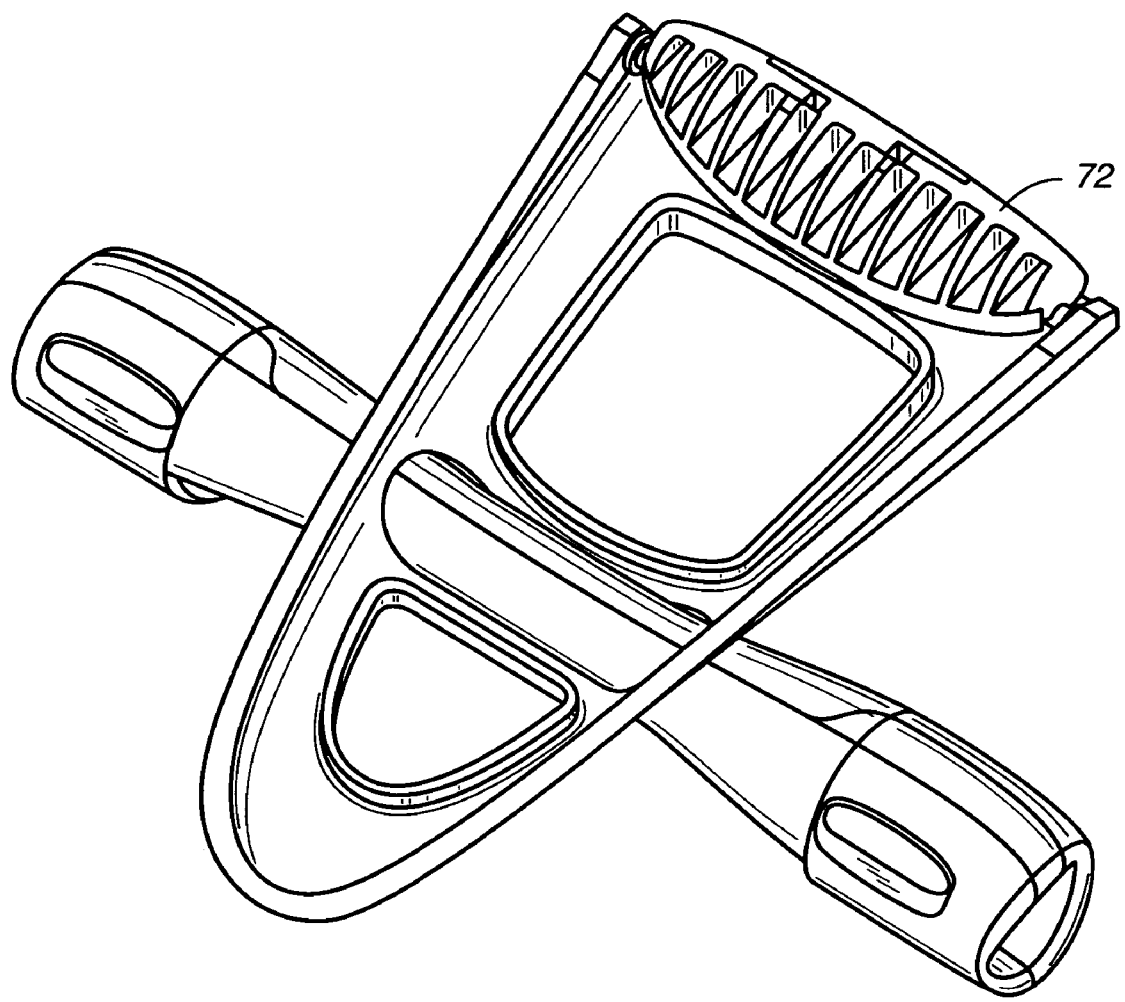
FIG._2B

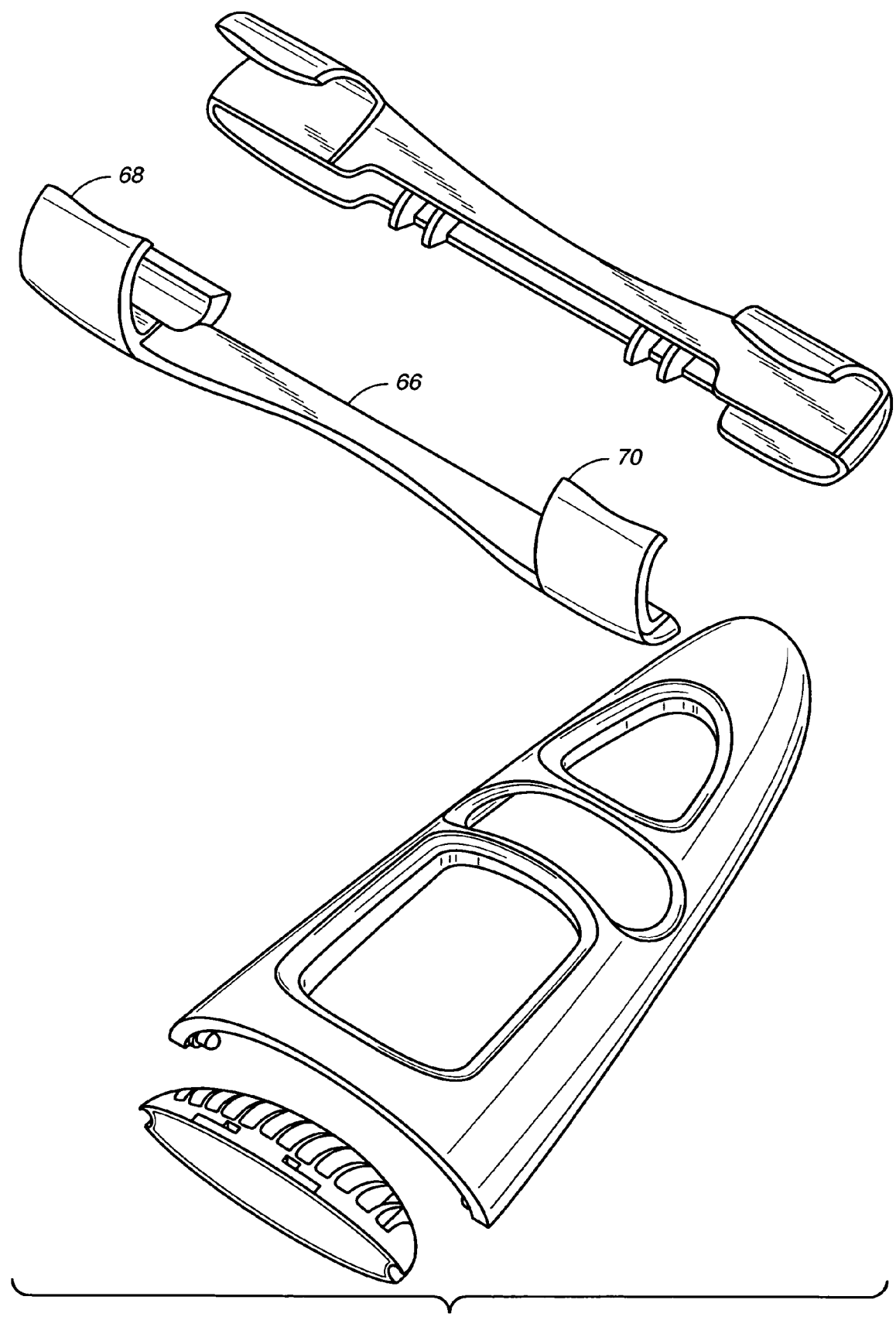
FIG._2C

HINGE AND BINDING APPARATUS FOR DISPLAYING PROCEDURAL INFORMATION CARDS IN THE WORKPLACE

CROSS REFERENCE TO RELATED APPLICATIONS

The present application claims the benefit of the filing date of U.S. Provisional Patent Application, Ser. No. 60/538,546, filed Jan. 22, 2004, for an I-BEAM HINGE FOR DISPLAYING TECHNICAL INSTRUCTION CARDS ON A COMPUTER VIDEO MONITOR, and U.S. Provisional Patent Application, Ser. No. 60/579,503, filed Jun. 10, 2004, for a HINGE AND BINDING APPARATUS FOR DISPLAYING PROCEDURAL INFORMATION CARDS IN THE WORKPLACE, both by applicant herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to information display devices, and more particularly to an apparatus for displaying procedural information cards on a computer video monitor or other piece of equipment, in a cashiering area or other workplace space.

BACKGROUND INFORMATION AND DISCUSSION OF RELATED ART

Office workers, retail associates and other personnel routinely place instructional information in the immediate vicinity of their workstation. Commonly, such material includes personalized employer or manufacturer provided instructions regarding software use, policy, procedures, or other information. For the purposes of this disclosure, such material will be generally termed procedural information.

The prior art includes numerous devices for attaching items to a computer display device. However, until the present inventor disclosed an inventive mounting apparatus in U.S. Pat. No. 5,819,456, hereby incorporated by reference herein, there remained a need for an apparatus that enables a computer user to position a maximum amount of utilitarian and decorative items in his or her field of view near the display screen. The '456 patent teaches a display card mounting device for attaching an instructional card holder directly to a front bezel surface of a computer display. The apparatus can be used in connection with attachable/detachable cards, for training personnel to use computers. The display cards may include tips and hints for using popular word processing programs, spread sheets, proprietary software programs, or other information pertaining to products and services. The display cards may include printed indicia showing, for example, a summary of useful software commands such as "short-cut" control sequences for triggering commands or scripts for customer service representatives.

Typically, the cards and the mounting apparatuses are employed as training aids to assist personnel or students in learning new material. Without the benefit of the system of the '456 patent, companies often trained personnel, and schools trained students exclusively by providing user manuals and requiring the personnel or students being trained to learn the software commands by directly consulting the user manuals. Such user manuals are expensive and need frequent replacement with each software upgrade. For proprietary software, such upgrades may be frequent and such user manuals may be quite expensive, resulting in significant costs. Also, when personnel are required to learn by consulting user manuals, the time required to effectively train the personnel may also be significant. In particular, the personnel may be reluctant to frequently consult a potentially cumbersome user manual which often is not easily accessible, and therefore may not learn the necessary new material quickly or efficiently. Hence, human trainers are often employed to expedite training, resulting in still further costs.

With the system of the '456 patent, display cards containing, for example, a summary of pertinent software commands, are provided for mounting directly to the computer display. To learn the pertinent procedures, personnel being trained merely consult the display cards. Depending upon the information provided on the display cards, it may be completely unnecessary to provide a separate user manual. Hence, the costs associated with providing new user manuals or providing supplements or inserts to existing user manuals are substantially avoided. Rather, only the costs associated with providing the relatively inexpensive display cards and the mounting apparatuses of the invention may be incurred. Such is particularly desirable when training personnel to use proprietary software subject to frequent upgrades which would otherwise require obtaining frequent, and possibly expensive, user manual updates. Moreover, by eliminating the need to consult cumbersome user manuals, personnel being trained may be trained much more quickly and efficiently, further reducing training costs. In many circumstances trainers may no longer be required.

With the system shown in the '456 patent, the display cards are mounted parallel with the display screen of the computer such that personnel being trained can easily reference information by simply glancing at the display cards. Hence, the speed by which new information provided on the cards can be consulted is greatly increased. Also, personnel being trained are simply more likely to consult reference information when such reference information is provided immediately adjacent to, and parallel with, the computer display, than when provided separately. Hence, training time can be significantly reduced.

Depending upon the amount of information required to be summarized, several display cards may be provided to personnel or students. With the system of the '456 patent, the display cards are tabbed and pivotally mounted such that personnel or students being trained can easily flip to the card containing the desired information. Also, the display cards are mounted to the display screen of the computer using semi-ring card holding members such that the cards can be quickly replaced with new cards to accommodate changes, or to add cards for new procedures. Cards may be replaced selectively either individually or several at a time, and this results in substantial savings if and as card content changes.

Although the display card system described in the '456 patent represented a significant improvement over predecessor systems, room for improvement remained, and the present inventor taught and disclosed such improvements in U.S. Pat. Nos. 6,209,246 and 6,430,856, each of which were progeny of the originally filed disclosure for the '456 patent, and each of which are incorporated in their entirety by reference herein.

U.S. Pat. No. 6,209,246 discloses a card assembly for use with a computer display device which includes at least one card and a card holder for holding the card. In addition, the card assembly also includes a mounting unit that is connected to the card holder. This mounting unit rigidly and detachably affixes the card holder to the computer display device.

U.S. Pat. No. 6,430,856 teaches a card assembly with a pocket for use with a computer display device. A variety of mounting systems are provided for mounting display cards, photographs, or other material to a computer display device of a computer system. The display cards may include printed indicia showing, for example, a summary of useful software commands for use with software programs running on the computer system. In one embodiment, a pair of mounting units or hinges are provided for pivotably mounting the display cards to the computer display device so that selected cards may be pivoted into a position adjacent to a front surface of the display screen for ease of viewing. In another example, a transparent pocket is provided for receiving the display cards, with the pocket being pivotably mounted to the display device via the mounting units. By providing a pocket, the display cards are protected while in use. Also, the display cards need not include any mounting holes or other attachment elements for direct attachment to the mounting units. Rather, any suitably sized and shaped display card, photograph, sheet of paper, or the like may be inserted within the pocket for pivotal mounting to the computer display device via the mounting hinges.

As with the more recently issued '246 and '856 patents, the present invention is also directed to providing further improvements in the art.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention provides an apparatus for displaying procedural information cards with optional capability to attach to a computer video monitor or other piece of equipment either in a cashiering area or any other workplace space. The inventive apparatus includes a central shaft portion having a pair of ends, with each end including a generally semicircular ring portion adapted to capture the slots of one or more cards. The central shaft portion may be releasably captured in a channel of a universal mount or swing arm portion. Removal of the shaft portion from the channel permits the shaft portion to be split open along a break, thereby opening the rings along breaks in the manner of a split-ring binder. Alternatively, the shaft portion may be used alone (i.e., without a mount or swing arm) to hold a quantity of cards. The ring portions could also be hinged, spring-loaded, or otherwise adapted to be opened to accommodate the slots of procedural information cards in any other of a variety of ways. The swing arm may be hinged upon a base portion with attachment means for affixing the apparatus to the chassis or peripheral surface surrounding a CRT or LCD computer video monitor, so that the swing arm and shaft portion can swing forward and around, toward the middle of the screen. When affixed to a monitor, the semicircular rings facilitate easy installation and flipping of instructional cards of the type shown in U.S. Pat. No. 6,430,856. The universal mount could be used to affix the apparatus to any equipment or workplace surface.

It is therefore an object of the present invention to provide a new and improved apparatus for displaying procedural information cards in the workplace environment.

It is another object of the present invention to provide a new and improved apparatus for adding and removing such cards.

A further object or feature of the present invention is a new and improved apparatus for flipping the cards so displayed.

An even further object of the present invention is to provide a novel apparatus for positioning the cards relative to a computer monitor or other piece of equipment.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and its objects and advantages will become apparent when consideration is given to the following detailed description thereof. Such description makes reference to the annexed drawings wherein:

FIG. 1A is a front perspective view of a first embodiment of a hinge and binding apparatus for displaying procedural information cards in the workplace of the present invention;

FIG. 1B is a rear perspective view of the hinge and binding apparatus of FIG. 1A;

FIG. 2A is a front perspective view of a second embodiment of a hinge and binding apparatus for displaying procedural information cards in the workplace of the present invention;

FIG. 2B is a rear perspective view of the hinge and binding apparatus of FIG. 2A; and FIG. 2C is an exploded front perspective view of the hinge and binding apparatus of FIG. 2A, illustrating the splitting of the shaft portion to open the semicircular ring portions.

DETAILED DESCRIPTION OF THE INVENTION

Referring to FIGS. 1A and 1B, wherein like reference numerals refer to like components in the views, there is illustrated therein a first embodiment of a new and improved hinge and binding apparatus for displaying procedural information cards in the workplace, generally denominated 10 herein. These figures illustrate a first preferred embodiment of the present invention.

The inventive apparatus may be summarily characterized as a procedural information card hinge, and comprises a central shaft portion 12 having an upper end 14 and a lower end 16. Each end includes a generally semicircular ring portion 18, 20, adapted to capture the slots of one or more procedural information cards.

The central shaft portion 12 may be releasably captured in channel 22 of universal mount 24. Removal of the shaft portion 12 from the universal mount 24 permits the shaft portion to be split open along longitudinal break 26, thereby opening the rings along breaks 28, 30 in the manner of a split-ring binder. The shaft portion is prevented from inadvertent opening by snaps or tabs 31. Alternatively, the ring portions 18, 20 could be hinged, spring-loaded, or otherwise adapted to be opened and closed to accommodate the slots of procedural information cards in any other of a variety of ways well known in the art.

The rear surface 32 of the universal mount 24 includes attachment means 34 for affixing the apparatus to the chassis or peripheral surface surrounding a CRT or LCD computer video monitor, or other surface. Preferably the attachment means comprises double-sided adhesive material or hook-and-loop fastener, though any suitable affixation means is contemplated in the present disclosure. Accordingly, when affixed to a monitor, the semicircular rings 18, 20 facilitate easy installation and flipping of instructional cards of the type shown in FIG. 10 of U.S. Pat. No. 6,430,856.

FIG. 2A is a front perspective view of a second embodiment 50 of a hinge and binding apparatus for displaying procedural information cards in the workplace of the present invention; while FIG. 2B is a rear perspective view and FIG. 2C is an exploded front perspective view, illustrating the splitting of the shaft portion to open the semicircular ring portions.

This second embodiment 50 of the hinge and binding apparatus comprises a central shaft portion 52 having a first end 54 and a second end 56. Each end includes a generally semicircular ring portion 58, 60, adapted to capture the slots of one or more procedural information cards.

The central shaft portion 52 may be releasably captured in channel 62 of swing arm 64. Removal of the shaft portion 52 from the swing arm 64 permits the shaft portion to be split open along longitudinal break 66, thereby opening the rings along breaks 68, 70 in the manner of a split-ring binder. Alternatively, the ring portions 58, 60 could be hinged, spring-loaded, or otherwise adapted to be opened and closed to accommodate the slots of procedural information cards in any other of a variety of ways well known in the art.

Swing arm 64 may include hinged connector 72. The rear surface 74 of the hinged connector 72 includes attachment means 76 for affixing the apparatus to the chassis or peripheral surface surrounding a CRT or LCD computer video monitor, e.g., to the side of a monitor near the front edge. Preferably the attachment means comprises double-sided adhesive material or hook-and-loop fastener, though any suitable affixation means is contemplated in the present disclosure. Accordingly, when affixed to a monitor, the swing arm and shaft portion can swing forward and around, toward the middle of the screen, and the semicircular rings 58, 60 facilitate easy installation and flipping of instructional cards of the type shown in FIG. 10 of U.S. Pat. No. 6,430,856.

As a further alternate application of the invention, the hinge and binding apparatus may be used independent of a computer monitor. For example, the universal mount of the apparatus could be placed on a desk, shelf, wall, or other surface, to provide a stand-alone display for procedural information cards, technical instruction cards, or other cards or material.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed is:

1. An apparatus for displaying procedural information cards, said apparatus comprising:

a central shaft portion having a pair of ends, each end including a generally semicircular ring portion adapted to capture the slots of one or more cards, said central shaft portion having a longitudinal break, and said semicircular ring portions including means for opening and closing; and a mount portion having a channel adapted for releasable capture of said central shaft portion, wherein the capture of said shaft portion in the channel of said mount portion prevents said central shaft portion from being split open along said longitudinal break and wherein removal of said central shaft portion from said channel permits said central shaft portion to be split open along said longitudinal break, thereby opening said semicircular ring portions to enable addition or removal of procedural information cards.

2. The apparatus for displaying procedural information cards of claim 1 wherein said ring portions comprise split rings.

3. The apparatus for displaying procedural information cards of claim 1 wherein said mount portion includes attachment means for affixing the apparatus to a peripheral surface surrounding a computer video monitor.

4. The apparatus for displaying procedural information cards of claim 3 wherein said attachment means comprises double-sided adhesive.

5. The apparatus for displaying procedural information cards of claim 3 wherein said attachment means comprises hook-and-loop fastener.

6. The apparatus for displaying procedural information cards of claim 1 wherein said mount portion is hinged upon a base portion.

7. The apparatus for displaying procedural information cards of claim 6 wherein said base portion includes attachment means for affixing the apparatus to a peripheral surface surrounding a computer video monitor.

8. The apparatus for displaying procedural information cards of claim 7 wherein said attachment means comprises double-sided adhesive.

9. The apparatus for displaying procedural information cards of claim 7 wherein said attachment means comprises hook-and-loop fastener.

10. The apparatus for displaying procedural information cards of claim 1 wherein said central shaft portion includes tabs to prevent inadvertent opening.

\* \* \* \* \*